US011802401B2

(12) United States Patent
Abernathy et al.

(10) Patent No.: US 11,802,401 B2
(45) Date of Patent: Oct. 31, 2023

(54) STRUCTURAL SUPPORT MEMBER WITH SWAGED FEMALE INTERFACE

(71) Applicant: Bull Moose Tube Company, Chesterfield, MO (US)

(72) Inventors: Mark Scott Abernathy, Ballwin, MO (US); Jeffrey A. Packer, Toronto (CA)

(73) Assignee: BULL MOOSE TUBE COMPANY, Chesterfield, MO (US)

( * ) Notice: Subject to any disclaimer, the term of this patent is extended or adjusted under 35 U.S.C. 154(b) by 830 days.

(21) Appl. No.: 16/303,050

(22) PCT Filed: Apr. 2, 2018

(86) PCT No.: PCT/US2018/025693
§ 371 (c)(1),
(2) Date: Nov. 19, 2018

(87) PCT Pub. No.: WO2018/187211
PCT Pub. Date: Oct. 11, 2018

(65) Prior Publication Data
US 2020/0018058 A1 Jan. 16, 2020

Related U.S. Application Data

(60) Provisional application No. 62/480,846, filed on Apr. 3, 2017.

(51) Int. Cl.
*B23P 13/00* (2006.01)
*F16B 7/04* (2006.01)
(Continued)

(52) U.S. Cl.
CPC ............ *E04B 1/2403* (2013.01); *B23P 13/00* (2013.01); *E04B 1/38* (2013.01); *E04B 2001/246* (2013.01);
(Continued)

(58) Field of Classification Search
CPC ......... Y10T 29/49631; Y10T 29/49623; Y10T 29/49616; B23P 11/00; B23P 11/005; B21D 39/04
See application file for complete search history.

(56) References Cited

U.S. PATENT DOCUMENTS 3,018,120 A * 1/1962 Vann ..................... F16L 23/125
285/55
4,269,438 A * 5/1981 Ridenour .............. F16L 13/166
29/523
(Continued)

FOREIGN PATENT DOCUMENTS

| CN | 104213643 A | 12/2014 |
| JP | H0978692 A | 3/1997 |
| WO | 2004051014 A1 | 6/2004 |

OTHER PUBLICATIONS

International Search Report and Written Opinion, dated Jul. 9, 2018, for International application No. PCT/US2018/025693.
(Continued)

*Primary Examiner* — Sarang Afzali
*Assistant Examiner* — Darrell C Ford
(74) *Attorney, Agent, or Firm* — Armstrong Teasdale LLP

(57) ABSTRACT

A swaged interface includes a male element that includes a male cavity defined by at least one male sidewall, and a plurality of first openings defined in the at least one male sidewall. The swaged interface also includes a female element that includes a female cavity defined by at least one female sidewall, and a plurality of second openings defined in the at least one female sidewall. The female element has an inner cross section sized to receive the male element such that each of the first openings is aligned with a respective one of the second openings. The inner cross section is formed by swaging.

9 Claims, 4 Drawing Sheets

(51) Int. Cl.
  *E04B 1/24* (2006.01)
  *E04B 1/38* (2006.01)
  *E04C 3/32* (2006.01)
(52) U.S. Cl.
  CPC ............ *E04B 2001/2451* (2013.01); *E04B 2001/2469* (2013.01); *E04C 3/32* (2013.01); *F16B 7/0413* (2013.01); *Y10T 29/49631* (2015.01)

(56) References Cited

U.S. PATENT DOCUMENTS

| | | | | |
|---|---|---|---|---|
| 4,645,247 A * | 2/1987 | Ward | ............... | B21D 39/04 285/382.4 |
| 5,421,781 A * | 6/1995 | Mackellar | ............... | F16D 1/068 464/181 |
| 5,549,335 A * | 8/1996 | Wohrstein | ............... | B23K 13/01 228/198 |
| 5,907,969 A | 6/1999 | Soder | | |
| 7,322,106 B2 * | 1/2008 | Marando | ............... | B22D 19/045 29/897 |
| 7,637,076 B2 * | 12/2009 | Vaughn | ............... | E04C 3/32 403/217 |
| 2001/0013419 A1 | 8/2001 | Edelstein | | |
| 2003/0177735 A1 | 9/2003 | Seeba et al. | | |
| 2005/0050730 A1 * | 3/2005 | Marando | ............... | B62D 29/008 29/428 |
| 2007/0209314 A1 | 9/2007 | Vaughn | | |
| 2007/0261356 A1 * | 11/2007 | Vaughn | ............... | E02D 27/34 52/655.1 |
| 2008/0115363 A1 * | 5/2008 | Marando | ............... | B22D 19/045 29/897.2 |
| 2008/0178551 A1 * | 7/2008 | Porter | ............... | E04B 1/26 52/745.19 |
| 2013/0125608 A1 * | 5/2013 | Meiners | ............... | B21D 22/025 72/401 |
| 2013/0239516 A1 | 9/2013 | Vaughn | | |
| 2014/0290154 A1 | 10/2014 | Perko et al. | | |
| 2014/0373471 A1 * | 12/2014 | Knepp | ............... | E04C 3/36 52/745.17 |
| 2017/0233996 A1 * | 8/2017 | Abernathy | ............... | F16B 7/182 52/698 |

OTHER PUBLICATIONS

International Search Report and Written Opinion, dated Oct. 27, 2017, for related International application No. PCT/US2017/047337.

WITT. Forgings—Significance, Design, Production, Application. Apr. 1, 2011 (Apr. 1, 2011). [retrieved on Jun. 1, 2018], Retrieved from the Internet. <URL: http://www.euroforge.org/fileadmin/user_upload/eLibrary/IMU_Basic_Knowledge_English_final_11-03-14.pdf. pp. 1-3, 20, 30, 32-37, 49, 51, 54.

* cited by examiner

STRUCTURAL SUPPORT MEMBER WITH SWAGED FEMALE INTERFACE

CROSS REFERENCE TO RELATED APPLICATIONS

This application is a National Stage Entry of PCT/US2018/025693 filed on Apr. 2, 2018, which claims the benefit of, and priority to, U.S. Provisional Pat. App. Ser. No. 62/480,846 filed Apr. 3, 2017, the contents of each of which are hereby incorporated by reference in their entirety.

BACKGROUND

The field of the disclosure relates generally to tubular support members and, more particularly, to an interface for use in coupling together tubular support members in a building frame.

Many known building structures have a frame that includes a plurality of beams and a plurality of columns. When erecting a taller (e.g., multistory) building, it can be difficult to transport full-length columns to the building site, and it is common to instead transport each column in segments that are ultimately welded together at the building site. However, it can be time consuming and costly to weld column segments together at a building site.

BRIEF DESCRIPTION

In one aspect, a swaged interface is provided. The swaged interface includes a male element that includes a male cavity defined by at least one male sidewall, and a plurality of first openings defined in the at least one male sidewall. The swaged interface also includes a female element that includes a female cavity defined by at least one female sidewall, and a plurality of second openings defined in the at least one female sidewall. The female element has an inner cross section sized to receive the male element such that each of the first openings is aligned with a respective one of the second openings. The inner cross section is formed by swaging.

In another aspect, a method of forming a first column segment for a structural column is provided. The method includes providing a precursor column segment that includes a female cavity defined by at least one female sidewall. The at least one female sidewall has an initial inner cross section that is substantially constant along a length of the at least one female sidewall. The method also includes swaging a first portion of the at least one female sidewall adjacent to a first end of the precursor column segment, such that the inner cross section of the first portion is expanded to a preselected cross section. The first portion defines a female element of the first column segment.

In another aspect, a column for a moment-resisting frame is provided. The column includes a first hollow structural section (HSS) column segment that includes at least one male sidewall defining a male element. The first HSS also includes a plurality of first openings defined in the at least one male sidewall along the male element. The column also includes a second HSS column segment that includes at least one female sidewall defining a female element. The second HSS column also includes a plurality of second openings defined in the at least one female sidewall along the female element. The male element is received within an inner cross section of the female element such that each of the first openings is aligned with a respective one of the second openings. The inner cross section is formed by swaging. The column further includes a plurality of fasteners. Each of the fasteners is received within a corresponding aligned pair of the first and second openings such that the male and female elements are coupled together.

DETAILED DESCRIPTION

The following detailed description illustrates tubular support members with swaged interfaces and methods of assembling the same by way of example and not by way of limitation. The description enables one of ordinary skill in the art to make and use the tubular support members, and the description describes several embodiments of the tubular support members, including what is presently believed to be the best modes of making and using the tubular support members. Exemplary tubular support members with swaged interfaces are described herein as being used to couple together support members in a building frame. However, it is contemplated that tubular support members with swaged interfaces have general application to a broad range of systems in a variety of fields other than frames of buildings.

Figure 1:
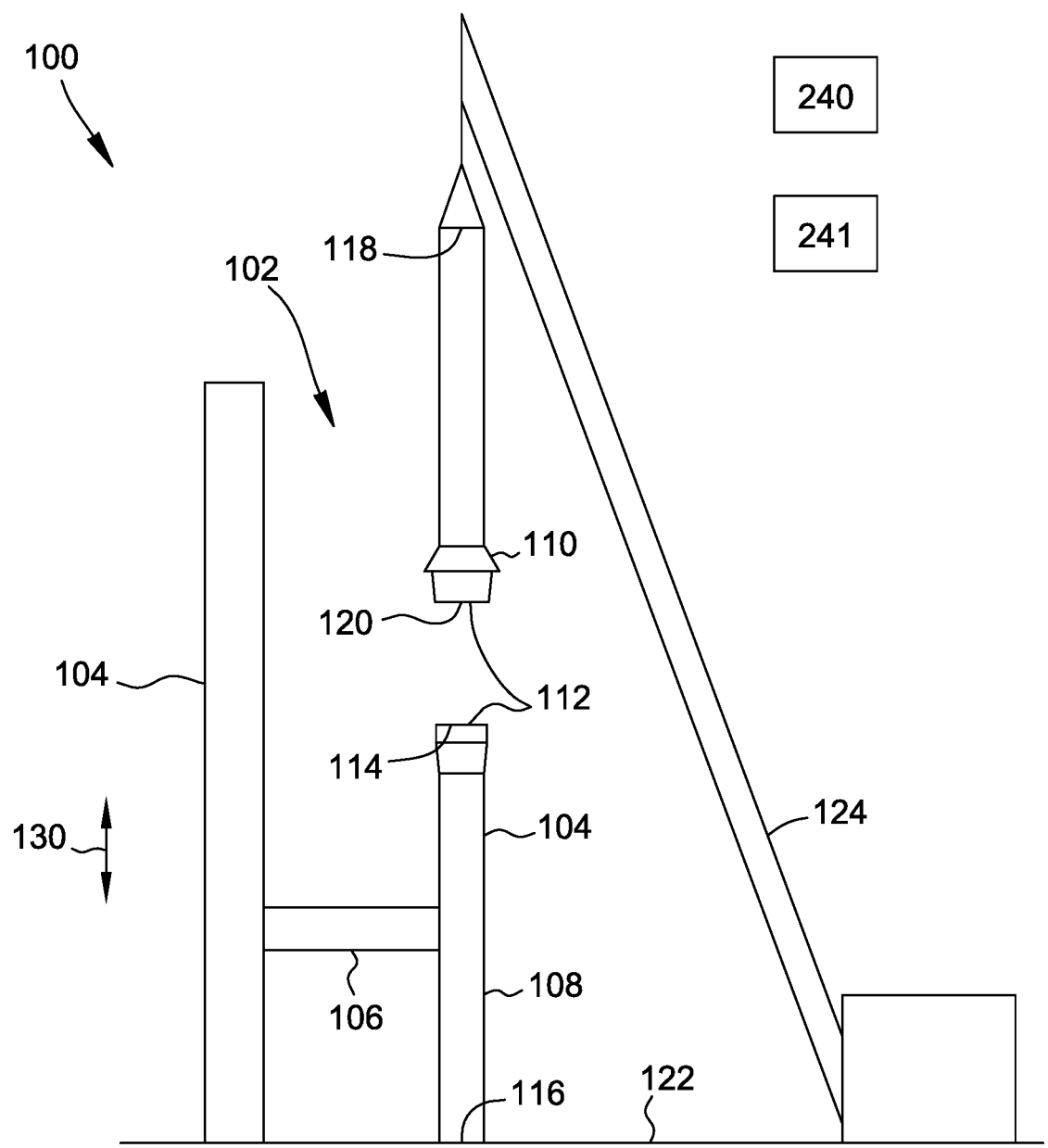
FIG. 1 is a schematic illustration of a site at which an exemplary building frame is being erected.

FIG. 1 is a schematic illustration of a site 100 at which an exemplary building frame 102 is being erected. In the exemplary embodiment, building frame 102 is a moment-resisting frame (e.g., a special moment frame or an intermediate moment frame) that includes a plurality of columns 104 and a plurality of beams 106. In some embodiments, columns 104 and beams 106 are made of structural steel. In other embodiments, columns 104 and beams 106 may be made of any suitable material that facilitates enabling frame 102 to function as described herein. In the exemplary embodiment, at least one column 104 of frame 102 has a first column segment 108 and a second column segment 110 that are coupled together at a moment-resisting swaged interface 112. More specifically, first column segment 108 has a first end 114 and a second end 116, and second column segment 110 has a first end 118 and a second end 120. Swaged interface 112 is defined at first end 114 of first column segment 108 and at second end 120 of second column segment 110, such that at least one column 104 of frame 102 is assembled onsite by coupling its associated first column segment 108 to its associated second column segment 110 at first end 114 and second end 120, respectively, using swaged interface 112. Although first column segment 108 is illustrated as being coupled to a foundation 122 in the exemplary embodiment, first column segment 108 may be other than coupled to foundation 122 in other embodiments (i.e., first column segment 108 may have any suitable position within frame 102, including a position that is elevated above foundation 122). Moreover, although second column segment 110 is illustrated as being lifted onto first column segment 108 using a crane 124 in the exemplary embodiment, second column segment 110 may be positioned with respect to first column segment 108 using any suitable method.

Figure 2:
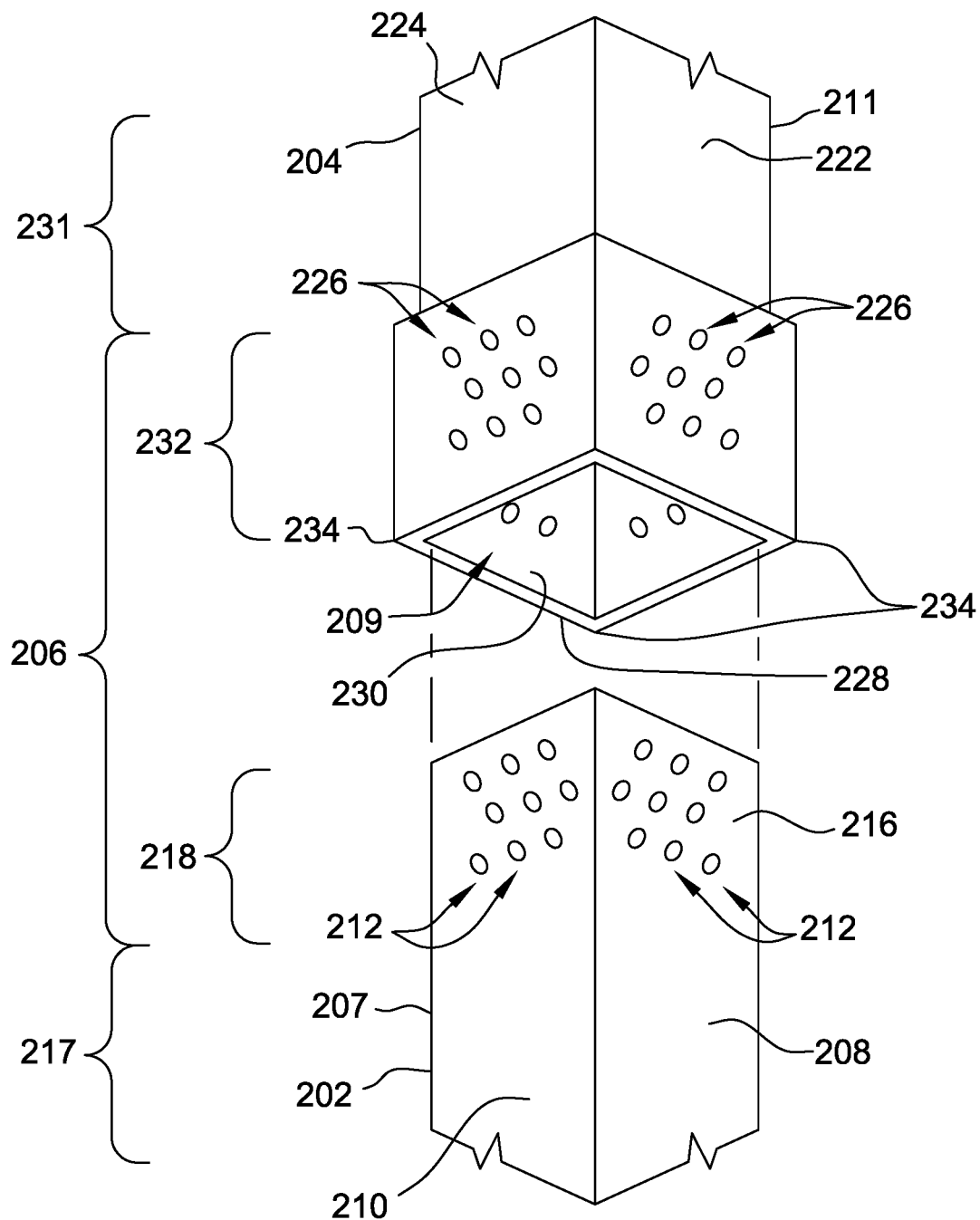
FIG. 2 is a perspective view of exemplary first and second column segments that may be used to form a column for use in the frame shown in FIG. 1.
Figure 3:
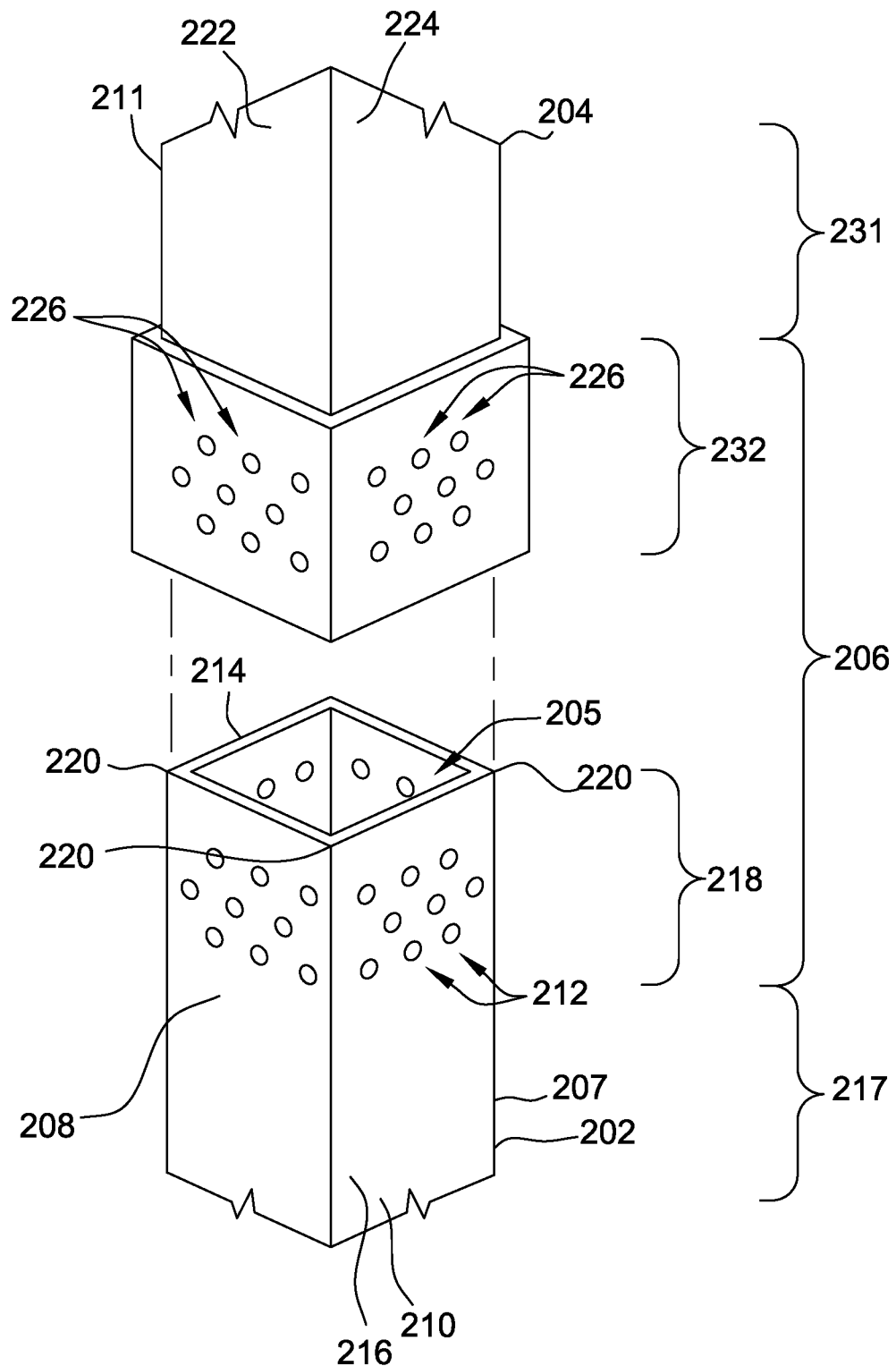
FIG. 3 is another perspective view of the first and second column segments shown in FIG. 2.
Figure 4:
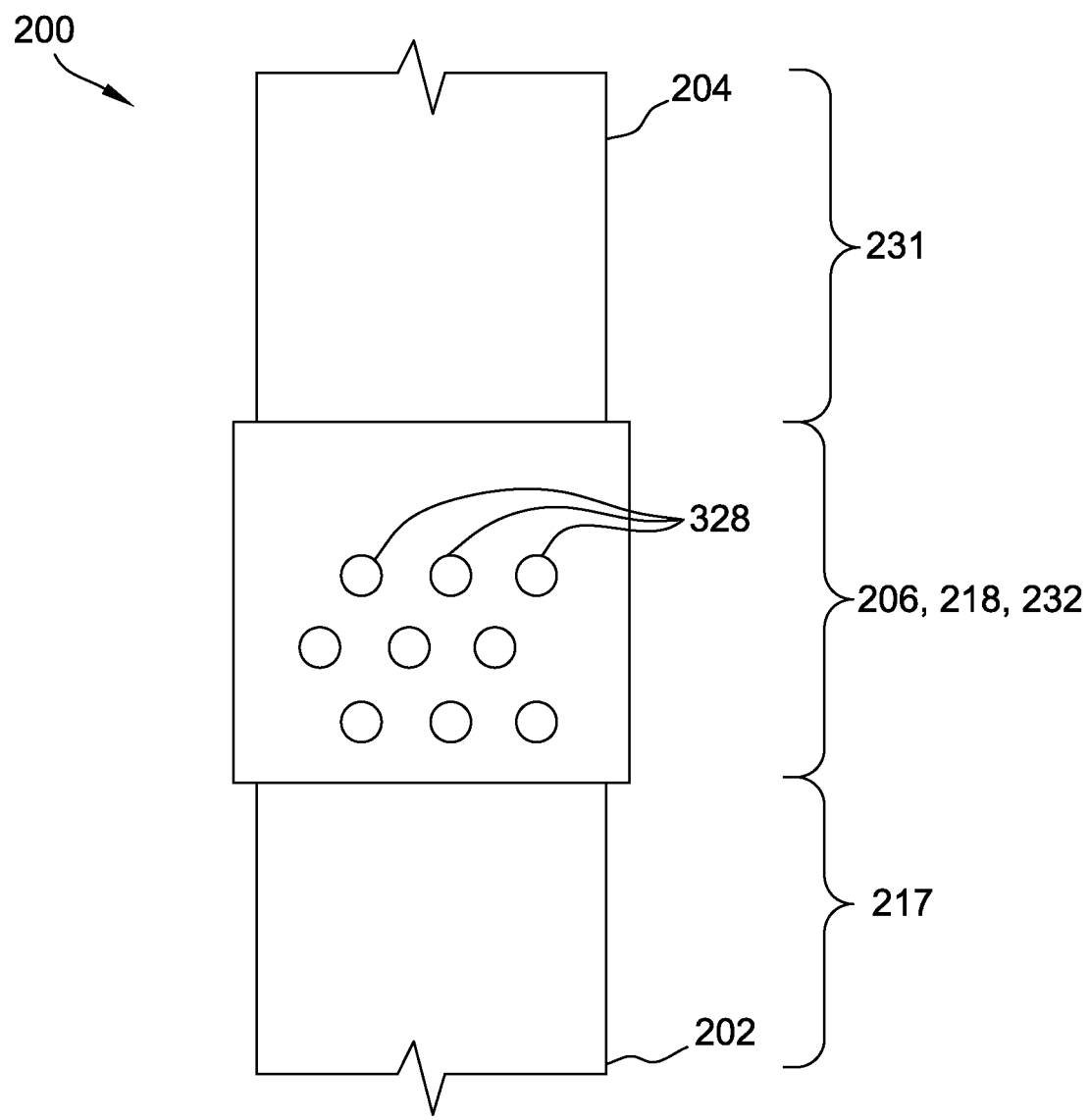
FIG. 4 is a side view of the first and second column segments shown in FIG. 2 in an exemplary assembled configuration.

FIG. 2 is a perspective view of an exemplary embodiment of a first column segment 202 and a second column segment 204 that may be assembled to form an embodiment of column 104 (shown in FIG. 1), designated as column 200 (shown in FIG. 4). FIG. 3 is another perspective view of first column segment 202 and second column segment 204. First column segment 202 and second column segment 204 cooperate to define an exemplary embodiment of moment-resisting swaged interface 112 (shown in FIG. 1), designated as swaged interface 206, for coupling first column segment 202 to second column segment 204. In the exemplary embodiment, first column segment 202 is a hollow structural section (HSS) that includes a first, or male, interior cavity 205 defined by at least one male sidewall 207, and second column segment 204 is a hollow structural section (HSS) that includes a second, or female, interior cavity 209 defined by at least one female sidewall 211. In the exemplary embodiment, male interior cavity 205 extends along an entire length of first column segment 202, and female interior cavity 209 extends along an entire length of second column segment 204, such that each of first and second column segments 202 and 204 is open to the respective interior cavity on both ends. Alternatively, in some embodiments, first column segment 202 is closed on at least one end and/or second column segment 204 is closed on one end.

Alternatively, in some embodiments, first column segment 202 and/or second column segment 204 may be any suitable column segment (e.g., at least one of first column segment 202 and second column segment 204 may be other than a hollow structural section (HSS)). Moreover, in other embodiments, segments 202 and 204 may not be column segments, but may instead be another suitable type of support member that is coupleable using swaged interface 206 as described herein.

In the exemplary embodiment, the at least one male sidewall 207 of first column segment 202 includes a pair of opposing male side walls 208 and a pair of opposing male end walls 210. Male side walls 208 and male end walls 210 collectively define a male end surface 214 generally perpendicular to walls 208 and 210, and collectively define a male outer surface 216. A male element 218 of first column segment 202 is defined adjacent to male end surface 214, and partially defines swaged interface 206. Moreover, in certain embodiments, the at least one male sidewall 207 of first column segment 202 has at least one first opening 212 defined therein and extending therethrough. For example, in the exemplary embodiment, each of male side walls 208 and male end walls 210 along male element 218 has at least one first opening 212 defined therein and extending therethrough. In the exemplary embodiment, male outer surface 216 has a substantially rectangular cross-section along male element 218 (i.e., male outer surface 216 has four male outer corners 220 along male element 218, each male outer corner 220 being defined at the junction of a male side wall 208 and a male end wall 210). In alternative embodiments, male outer surface 216 has any suitable cross-section that enables swaged interface 206 to function as described herein.

First column segment 202 also has a base outer cross-section defined along a mid-portion 217 of first column segment 202. In the exemplary embodiment, the base outer cross-section of first column segment 202 along mid-portion 217 is substantially identical to the cross section of male outer surface 216 along male element 218. In some such embodiments, the substantially identical cross section of male outer surface 216 along mid-portion 217 and male element 218 facilitates a decreased time and cost of manufacture of first column segment 202. In alternative embodiments, the base outer cross section of male outer surface 216 is any suitable cross section that enables first column segment 202 to function as described herein.

Likewise, in the exemplary embodiment, the at least one female sidewall 211 of second column segment 204 includes a pair of opposing female side walls 222 and a pair of opposing female end walls 224. Female side walls 222 and female end walls 224 collectively define a female end surface 228 generally perpendicular to walls 222 and 224, and collectively define a female inner surface 230. A female element 232 of second column segment 204 is defined adjacent to female end surface 228, and partially defines swaged interface 206. Moreover, in certain embodiments, the at least one female sidewall 211 of second column segment 204 has at least one second opening 226 defined therein and extending therethrough. For example, in the exemplary embodiment, each of female side walls 222 and female end walls 224 along female element 232 has at least one second opening 226 defined therein and extending therethrough.

In the exemplary embodiment, female inner surface 230 has a substantially rectangular cross-section along female element 232 (i.e., female inner surface 230 has four female inner corners 234 along female element 232, each female inner corner 234 being defined at the junction of a female side wall 222 and a female end wall 224). Moreover, in the exemplary embodiment, female inner surface 230 along female element 232 is sized and shaped to receive male outer surface 216 of male element 218 therein in a clearance fit, such that male outer surface 216 interfaces with female inner surface 230 adjacent female end surface 228. In alternative embodiments, female inner surface 230 has any suitable cross-section that enables swaged interface 206 to function as described herein. For example, each of the at least one male sidewall 207 along male element 218 and the at least one female sidewall 211 along female element 232 is substantially annular, such that each of surfaces 216 and 230 has a substantially circular cross-section. For another example, surfaces 216 and 230 have cross-sections that include other than substantially interfacing peripheries.

Second column segment 204 also has a base outer cross-section defined along a mid-portion 231 of second column segment 204. In the exemplary embodiment, the base outer cross-section along mid-portion 231 is smaller than or equal to the cross section of female inner surface 230 along female element 232. For example, the base outer cross section of female inner surface 230 along mid-portion 231 is substantially identical to the cross section of male outer surface 216 along male element 218 and mid-portion 217 of first column segment 202. In some such embodiments, the substantially identical outer cross sections of second column segment 204 along mid-portion 231, male outer surface 216 along male element 218, and mid-portion 217 of first column segment 202 enables providing column segments 202 and 204 as substantially identical members, each having female element 232 defined at a first end and male element 218 defined at an opposite second end, facilitating a decreased time and cost of manufacture of first column segment 202 and second column segment 204. In alternative embodiments, the base outer cross section along mid-portion 231 of second column segment 204 is any suitable cross section that enables second column segment 204 to function as described herein.

In the exemplary embodiment, male element 218 and female element 232 of swaged interface 206 are substantially the same length. In other embodiments, each of male element 218 and female element 232 has any suitable length that facilitates their use as described herein.

In the exemplary embodiment, female element 232 of swaged interface 206 is formed using a hot-working swaging process. For example, second column segment 204 is formed from a hollow precursor column segment including the at least one female cavity 209 defined by the at least one female sidewall 211 having a substantially constant inner cross section along a length of the at least one female sidewall 211. A first portion of the at least one female sidewall 211 adjacent to a first end of the precursor column segment, corresponding to the as-yet-to-be-formed female element 232 adjacent to female end surface 228, is inductively or gas-furnace heated and forced into a mandrel 240 and die 242 arrangement or mandrel 240 and forming rolls arrangement (not shown). Alternatively, the first portion is heated in any suitable fashion. The mandrel 240 expands the inner cross section of the first portion to obtain the preselected cross section of female inner surface 230 that defines female element 232, and the die 242 or forming rolls simultaneously shape the outer surface of female element 232, such that female element 232 is integral with mid-portion 231. In alternative embodiments, female element 232 of swaged interface 206 is formed using a cold-working swaging process. In some embodiments, the swaging process forms female element 232 with substantially no material loss from the at least one female sidewall 211.

In certain embodiments, second openings 226 are machined through the at least one female sidewall 211 of female element 232 after the swaging step is completed. Additionally or alternatively, first openings 212 are machined through the at least one male sidewall 207 of male element 218 either before or after the swaging step is completed. As described above, in some embodiments, the initial cross section of the precursor column segment is substantially maintained at an opposite second end of the precursor column segment, and matches the cross section of outer surface 216 of male element 218, such that each first column segment 202 formed by the swaging process includes male element 218 receivable by female element 232 of second column segment 204 formed by the same swaging process.

In some embodiments, forming female element 232 of swaged interface 206 using a swaging process results in improved structural performance of swaged interface 206, as compared to a similar interface formed by welding elements together and/or machining material away from a precursor column segment. For example, forming female element 232 of swaged interface 206 using a swaging process increases a wall thickness of the at least one female sidewall 211 along female element 232, as compared to a similar interface formed by other processes. Additionally or alternatively, forming female element 232 of swaged interface 206 using a swaging process simplifies a certification process for assembled column 200. In alternative embodiments, female element 232 is formed using any suitable process that enables swaged interface 206 to function as described herein.

FIG. 4 is a side view of first column segment 202 and second column segment 204 coupled together to form column 200. In the exemplary embodiment, male element 218 of column segment 202 is received at least partially within female element 232 of column segment 204, as described above, such that each first opening 212 of the at least one male sidewall 207 is aligned with a respective second opening 226 of the at least one female sidewall 211. A respective one of a plurality of fasteners 328 (e.g., bolts) is inserted through each aligned pair of first and second openings 212 and 226, securing male element 218 to female element 232 to assemble column 200. In alternative embodiments, male element 218 and female element 232 are secured to form column 200 in any suitable fashion that enables swaged interface 206 to function as described herein.

With reference to FIGS. 1-4, to assemble column 200 onsite when erecting frame 102, first column segment 202 is coupled to a suitable base structure (e.g., foundation 122 or another support member of frame 102). Second column segment 204 is then lowered, for example using crane 124, such that male element 218 is inserted into female element 232 and second column segment 204 is seated on top of first column segment 202. More specifically, in the exemplary embodiment, male element 218 is inserted into female element 232 such that each male side wall 208 is oriented in substantially face-to-face relationship with a corresponding female side wall 222, and each male end wall 210 is oriented in substantially face-to-face relationship with a corresponding female end wall 224. With second column segment 204 seated on first column segment 202, plurality of fasteners 328 (for example, blind bolts) are then inserted into second openings 226 of female element 232 and engage male element 218 via first openings 212. Upon tightening of fasteners 328, male element 218 is inhibited from moving relative to female element 232, and axial movement of first column segment 202 relative to second column segment 204 is also inhibited. It is understood that the orientation of the column segments may be reversed so that column segment 202 is seated on column segment 204, and so forth.

The methods and systems described herein facilitate erecting a moment-resisting frame at a building site. More specifically, the methods and systems facilitate coupling column segments together onsite using a swaged interface that is integral to the column segments. The methods and systems thereby facilitate eliminating the time that would otherwise be required to weld column segments to one another and/or to a connector between the column segments. As such, the methods and systems facilitate transporting longer columns to a building site in segments, and assembling the columns at the building site by coupling the associated column segments together using a moment-resisting interface that is strictly mechanical in nature. As such, the methods and systems facilitate reducing the time and cost associated with erecting a multistory, moment-resisting frame at a building site.

Exemplary embodiments of connecting interfaces and methods of assembling the same are described above in detail. The methods and systems described herein are not limited to the specific embodiments described herein, but rather, components of the methods and systems may be utilized independently and separately from other components described herein. For example, the methods and systems described herein may have other applications not limited to practice with frames of buildings, as described herein. Rather, the methods and systems described herein can be implemented and utilized in connection with various other industries.

While the disclosure has been described in terms of various specific embodiments, those skilled in the art will recognize that the disclosure can be practiced with modification within the spirit and scope of the claims.

What is claimed is:

1. A method of forming a first column segment for a structural column, said method comprising:

providing a precursor column segment including a female cavity defined by at least one female sidewall, the at least one female sidewall having an initial inner cross section;

swaging a first portion, adjacent to a first end of the precursor column segment, of the at least one female sidewall, by forcing the first portion of the at least one female sidewall into a die and forcing a mandrel into the female cavity, such that the inner cross section of the first portion is expanded to a preselected cross section, wherein the swaged first portion defines a female element of the first column segment;

removing the mandrel from within the female cavity; and machining a plurality of openings through the at least one sidewall of the female element.

2. The method in accordance with claim 1, wherein said swaging further comprises shaping an outer surface of the female element simultaneously as the inner cross section is expanded to the preselected cross section.

3. The method in accordance with claim 1, further comprising substantially maintaining the initial cross section of the precursor column segment at an opposite second end of the precursor column segment during said swaging.

4. The method in accordance with claim 3, further comprising:

forming a second column segment using said providing and swaging steps; and selecting the initial cross section of the precursor column segment of the first column segment such that the second end of the first column segment defines a male element receivable in a clearance fit by the female element of the second column segment.

5. The method in accordance with claim 4, further comprising forming the first and second column segments to be substantially identical.

6. The method in accordance with claim 1, wherein said swaging further comprises increasing a thickness of the at least one female sidewall along the female element.

7. The method in accordance with claim 1, wherein said swaging comprises a hot-working swaging process.

8. The method in accordance with claim 1, wherein said swaging comprises inductively heating the first portion of the at least one female sidewall.

9. The method in accordance with claim 1, wherein providing a precursor column segment further comprises providing a precursor column segment wherein the initial inner cross section of the female cavity is constant along a length of the at least one female sidewall.

* * * * *